United States Patent [19]

Hirai

[11] Patent Number: 5,751,376
[45] Date of Patent: May 12, 1998

[54] IMAGE FORMING APPARATUS AND METHOD FOR CREATING MOTION BLUR

[75] Inventor: Makoto Hirai, Suita, Japan

[73] Assignee: Matsushita Electric Ind., Osaka-fu, Japan

[21] Appl. No.: 558,031

[22] Filed: Nov. 13, 1995

[30] Foreign Application Priority Data

Nov. 15, 1994 [JP] Japan .................................. 6-306784

[51] Int. Cl.$^6$ .................................................. H04N 9/74
[52] U.S. Cl. ........................... 348/579; 382/279; 382/264; 345/137
[58] Field of Search ............................. 348/579, 580, 348/578, 597; 382/293, 162, 264, 294, 295, 279, 276; 396/3, 338; 352/85; 345/121, 136, 137; H04N 9/74

[56] References Cited

U.S. PATENT DOCUMENTS 5,125,041  6/1992  Kimura et al. ........................ 382/162
5,619,277  4/1997  Kobayashi ............................ 348/579

OTHER PUBLICATIONS

"A Two-and-a-Half-D Motion-Blur Algorithm", by Nelson L. Max et al., The Association for Computing Machinery (ACM), Computer Graphics, vol. 19, No. 3, 1985.

Primary Examiner—Michael H. Lee
Attorney, Agent, or Firm—Price, Gess & Ubell

[57] ABSTRACT

An image forming apparatus for creating an image of a motion blur, a trail of a rapidly moving object, by sequentially creating each pixel of the motion blur from pixel values of an original image, the apparatus including an image memory, a pixel position specifying unit, an original image data storage, an original image pixel value generating unit, a pixel value calculating unit, and a pixel value writing unit.

39 Claims, 13 Drawing Sheets

| dy/dx | xmod3 | | |
|---|---|---|---|
| | 0 | 1 | 2 |
| 0/−3 | ← | ← | ← |
| −1/−3 | ← | ↖ | ← |
| −2/−3 | ↖ | ← | ↖ |
| −3/−3 | ↖ | ↖ | ↖ |
| −3/−2 | ↖ | ↑ | ↖ |
| −3/−1 | ↑ | ↖ | ↑ |
| −3/0 | ↑ | ↑ | ↑ |

(b)

| dy/dx | xmod3 | | |
|---|---|---|---|
| | 0 | 1 | 2 |
| 0/3 | → | → | → |
| −1/3 | → | ↗ | → |
| −2/3 | ↗ | → | ↗ |
| −3/3 | ↗ | ↗ | ↗ |
| −3/2 | ↗ | ↑ | ↗ |
| −3/1 | ↑ | ↗ | ↑ |
| −3/0 | ↑ | ↑ | ↑ |

(c)

| dy/dx | xmod3 | | |
|---|---|---|---|
| | 0 | 1 | 2 |
| 0/−3 | ← | ← | ← |
| 1/−3 | ← | ↙ | ← |
| 2/−3 | ↙ | ← | ↙ |
| 3/−3 | ↙ | ↙ | ↙ |
| 3/−2 | ↙ | ↓ | ↙ |
| 3/−1 | ↓ | ↙ | ↓ |
| 3/0 | ↓ | ↓ | ↓ |

(d)

| dy/dx | xmod3 | | |
|---|---|---|---|
| | 0 | 1 | 2 |
| 0/3 | → | → | → |
| 1/3 | → | ↘ | → |
| 2/3 | ↘ | → | ↘ |
| 3/3 | ↘ | ↘ | ↘ |
| 3/2 | ↘ | ↓ | ↘ |
| 3/1 | ↓ | ↘ | ↓ |
| 3/0 | ↓ | ↓ | ↓ |

FIG. 8

| | A+B | number of shifted bit(S) |
|---|---|---|
| 811 | 0 | 0 |
| 812 | 1 ~ 7 | 1 |
| 813 | 8 ~ 15 | 2 |
| 814 | 16 ~ 29 | 3 |
| 815 | 30 ~ 51 | 4 |
| 816 | 52 ~ 85 | 5 |
| 817 | 86 ~ 132 | 6 |
| 818 | 133 ~ 190 | 7 |
| 819 | 190 ~ | 8 |

{ 81    82 }

FIG. 10
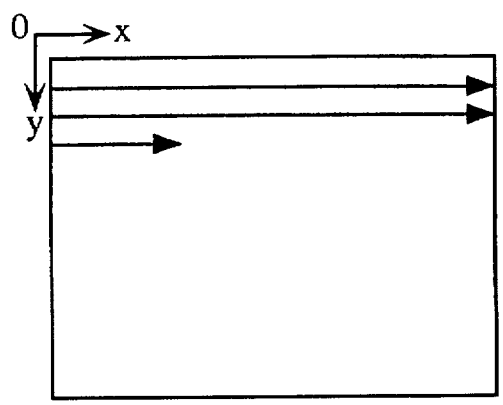
(a)
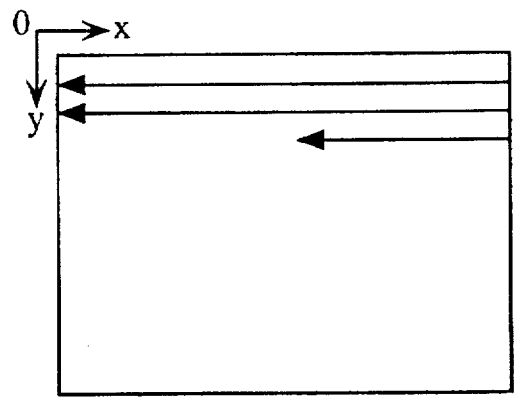
(b)
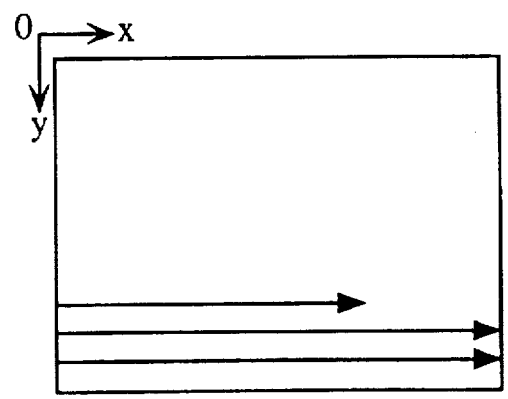
(c)
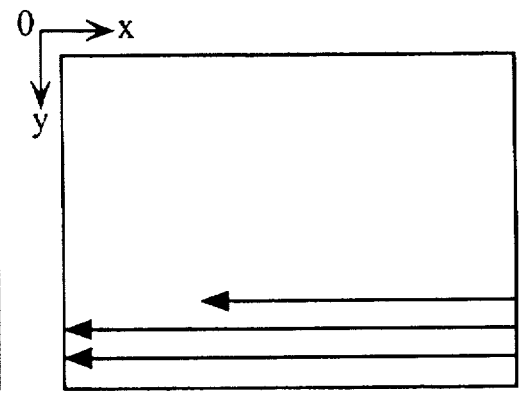
(d)

IMAGE FORMING APPARATUS AND METHOD FOR CREATING MOTION BLUR

BACKGROUND OF THE INVENTION

1. Field of the Invention

This invention relates to an image forming apparatus, and specifically relates to an image forming apparatus and an image forming method for creating a motion blur which is a trail of a rapidly moving object.

2. Description of the Prior Art

When a rapidly moving object is filmed with the shutter open for a certain the period, the filmed object is recognized as having a trail. This phenomenon is called a motion blur. A conventional image forming method produces the motion blur through the following steps:

i) The direction of the movement of the object is adjusted to be horizontal. In practice, the object is skewed.

ii) Each pixel value of the object is computed for its initial and final positions in the shutter-open period adverse to the direction of the movement.

iii) The object is unskewed.

A desired motion blur can be produced through the above steps. For detail, refer to "A Two-and-a-Half Motion-Blur Algorithm" by Nelson L. Max and Douglas M. Lerner, the Association for Computing Machinery (ACM), Computer Graphics, Vol.19, No.3, pp.85–93, 1985.

However, the above mentioned conventional method requires a lot of processes and data to be stored.

The reason the conventional method requires a lot of processes is: (a) tens of additions are required to compute a value of a composite pixel; (b) the addition results must be divided by the number of pixels present between its initial and final positions to obtain a mean value, and (c) the mean value and a weighted mean of linear weighting must be combined in an appropriate proportion in order to draw the trail maintaining the shape of the object and covering all the space between its initial and final positions for the shutter-open period.

Also the conventional method requires a lot of data to be stored because: (a) a memory is necessary for storing an intermediate result of skewing and unskewing, and (b) another memory is necessary for storing an intermediate result of the additions.

SUMMARY OF THE INVENTION

The first object of the present invention, in consideration of the above mentioned problems, is to provide an image forming apparatus which creates a motion blur with decreased processes and memories.

The above object is fulfilled by an image forming apparatus for creating an image of a motion blur of an object by sequentially creating each pixel of the motion blur from pixel values of an original image, the motion blur being a trail of a rapidly moving object, comprising: an image memory for storing pixel values of a motion-blur image; a pixel position specifying unit for sequentially specifying a first pixel position for all the pixels in the image memory adverse to a direction of the movement of the object; an original image data storage unit for storing data of the original image which includes an image of the object; an original image pixel value generating unit for generating an original image pixel value corresponding to the pixel position specified by the pixel position specifying unit based on the data stored in the original image data storage unit; a pixel value calculating unit for dividing by a certain value a result of the original image pixel value generated by the original image pixel value generating unit subtracted by a pixel value in the image memory whose pixel position is adjacent to the first pixel position specified by the pixel position specifying unit in the direction of the movement of the object and adding a quotient of the division to the pixel value to obtain a first pixel value each time the original image pixel value generating unit generates an original image pixel value; and a pixel value writing unit for writing the first pixel value obtained by the pixel value calculating unit as the pixel value of the first pixel position specified by the pixel position specifying unit.

The image forming apparatus as constructed above only requires a subtraction, a division, and an addition for calculating each pixel value instead of tens of additions performed by a conventional method. Besides, its image memory is used to store only calculated values. Therefore, a memory for storing intermediate values is not required in the present invention, and the quantity of data to be stored drastically decreases compared with the conventional method.

The pixel value calculating unit of the image forming apparatus may achieve the division by shifting the subtraction result in binary notation by a certain number of bits in a direction to a least significant bit.

The image forming apparatus as constructed above lessens a computation in which a result of a generated original image pixel value subtracted by a pixel value read by the pixel value reading unit is divided by a certain value because the division can be achieved by shifting the result in binary notation by a certain number of bits in the direction to the Least Significant Bit (LSB).

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7 shows a table used to specify a position of a previous pixel.

FIG. 8 shows a table used to determine the number of shifted bits.

FIG. 10 shows pixel position scan patterns.

DESCRIPTION OF THE PREFERRED EMBODIMENT

A preferred embodiment of the present invention is explained below with reference to the drawings.

Figure 1:
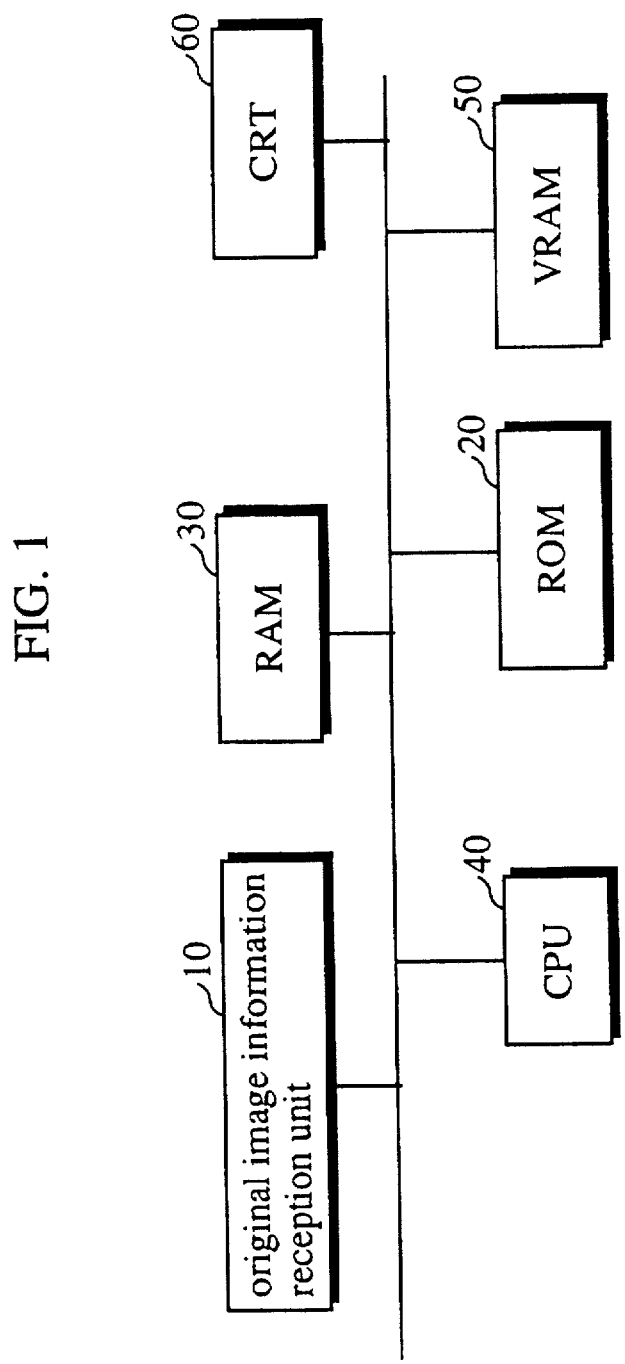
FIG. 1 shows a hardware construction of the animation image forming apparatus of the Embodiment.

FIG. 1 shows the hardware construction of an animation image forming apparatus of the present embodiment. The apparatus includes original image information reception unit 10, ROM 20, RAM 30, CPU 40, VRAM 50, and CRT 60.

Figure 2:
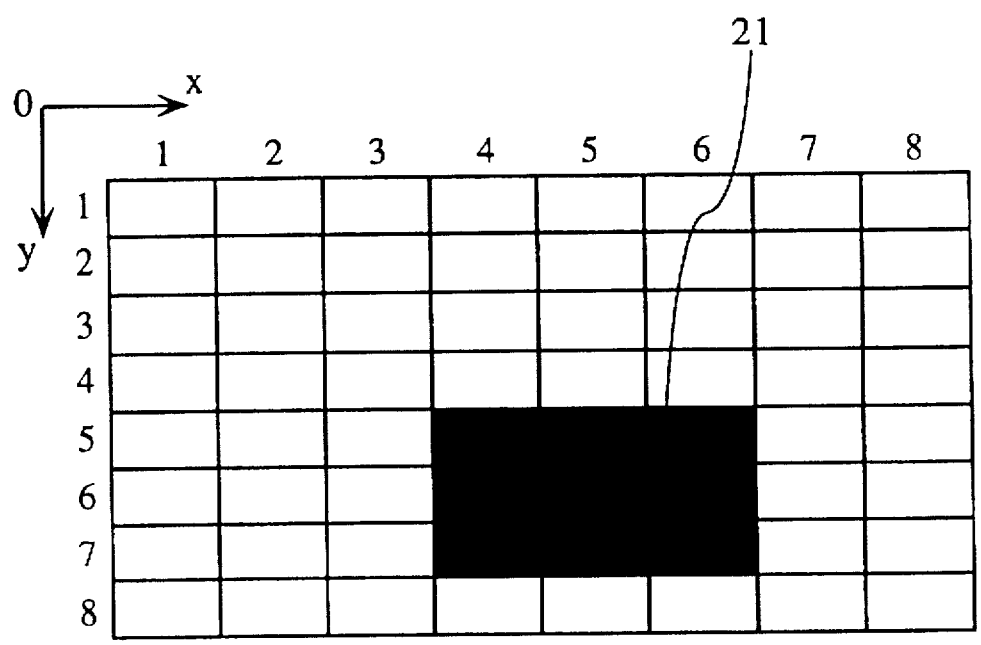
FIG. 2 shows an object in an original image.

Original image information reception unit 10 receives information on an original image such as object 21 shown in FIG. 2 from an original image information generating apparatus (an outer apparatus not shown in the figures). The information includes pixel values corresponding to the pixel positions written in VRAM 50, and the shape, direction of the movement, travel distance, and position of the object. The shape of the object may be represented by the vertex co-ordinates. The travel distance indicates how long the object has moved per unit time. The position of the object may be the information written in VRAM 50 indicating the location of the object. Note that the animation image forming apparatus may comprise an original image information generating unit in itself.

Figure 3:
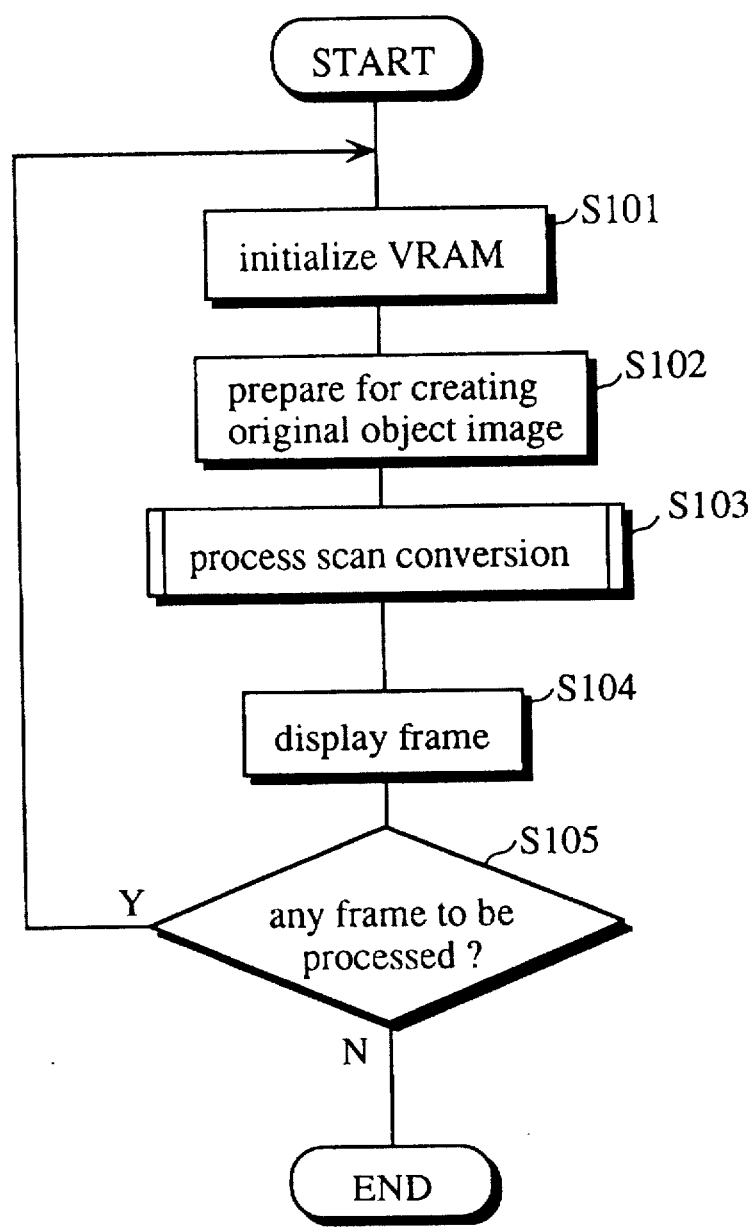
FIG. 3 is a whole flowchart of a program.
Figure 4:
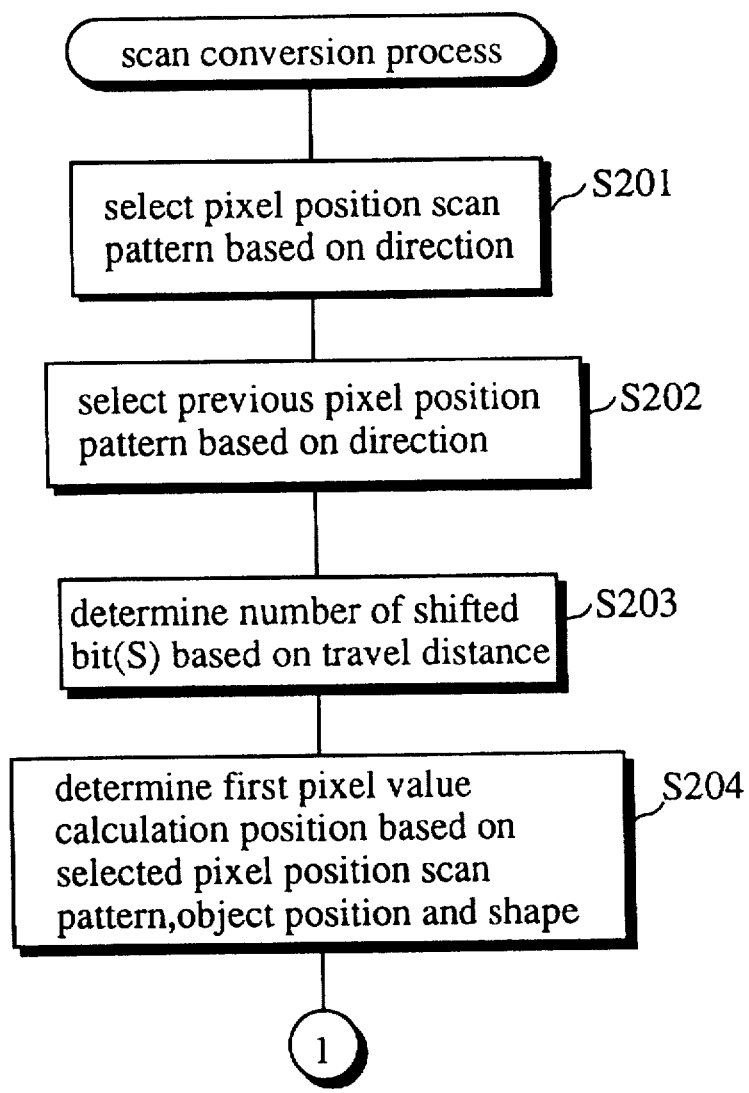
FIG. 4 is a flowchart of a subroutine of the program.
Figure 5:
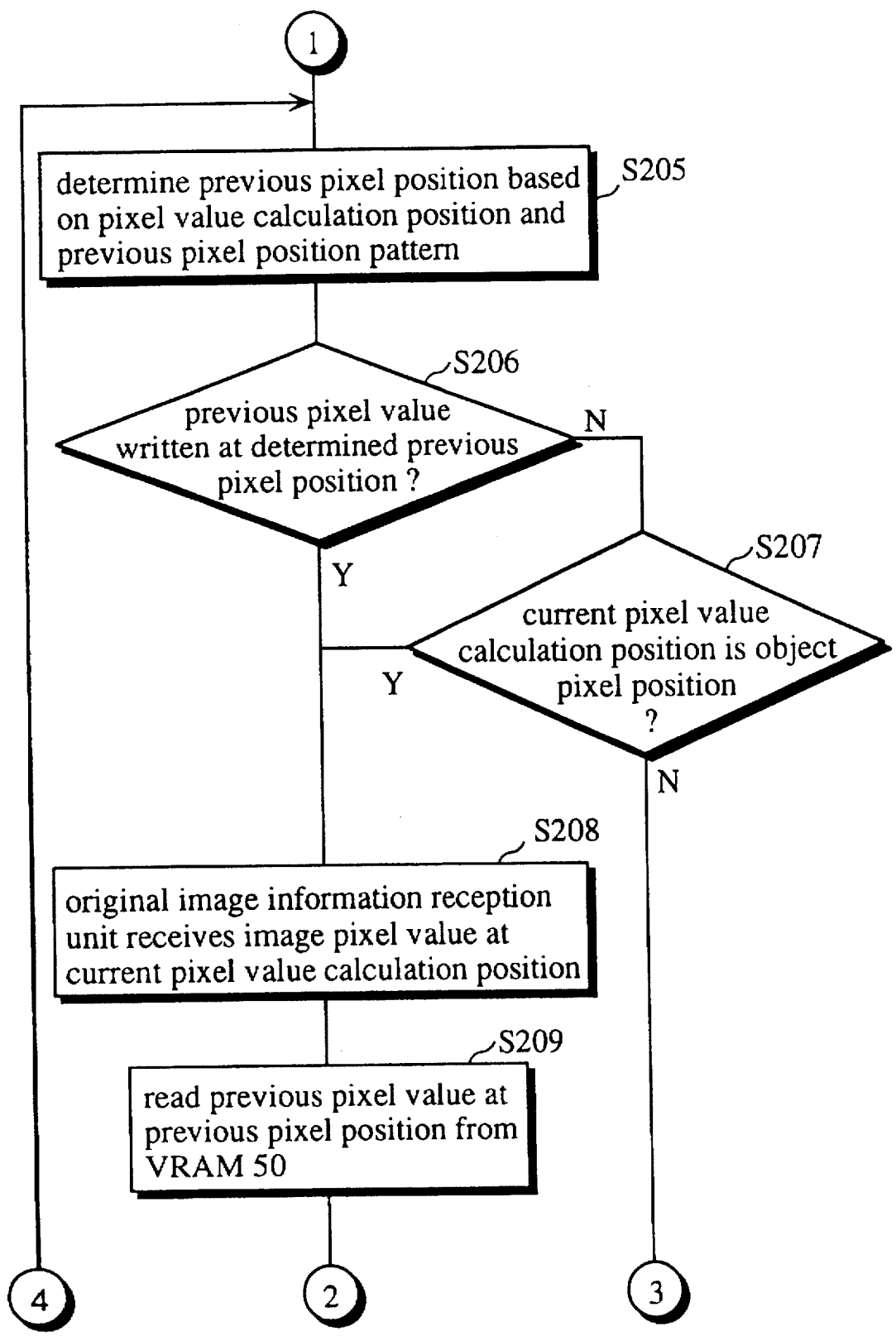
FIG. 5 is a flowchart continued from FIG. 4.
Figure 6:
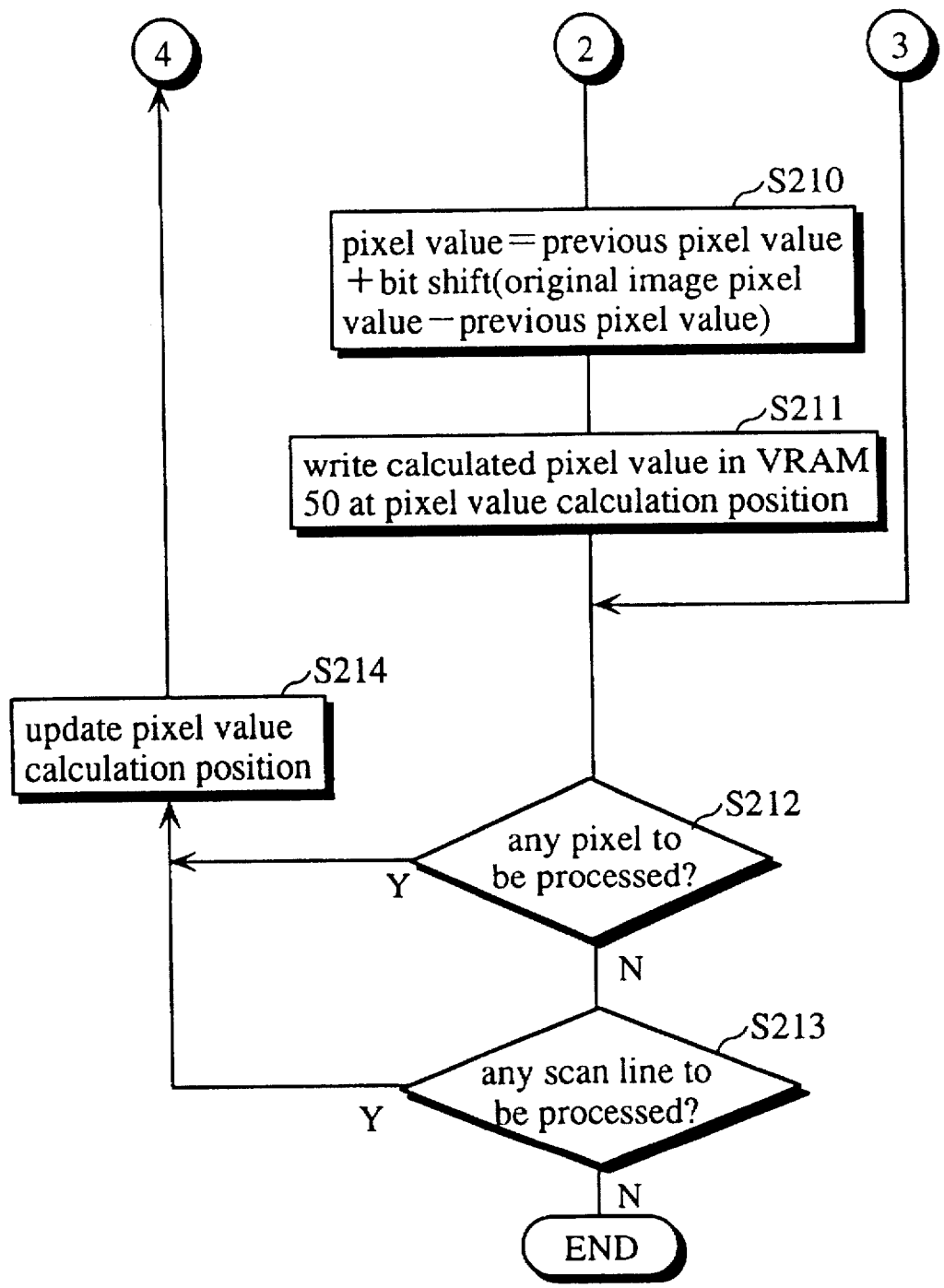
FIG. 6 is a flowchart continued from FIG. 5.

ROM 20 stores a program for computing pixel values of a motion blur. The program is explained below. FIG. 3 shows a whole flowchart of the program. First, the program initializes VRAM 50 then prepares for creating an image of an object. Then, at the scan conversion process, pixel values of the motion blur are computed. Finally, the image of the computed motion blur is displayed. The above processes are repeated again if any other frame, or image of motion blur to be created is detected. FIG. 4 to 6 show flowcharts of the scan conversion process. The process obtains the pixel value of a motion blur using the following equation:
<Equation>

--- pixel value = previous pixel value +
    bit shift (original image pixel value −
    previous pixel value),

--- wherein previous pixel value being a pixel value already written in VRAM 50, bit shift being an operation in which a value in ( ) in binary notation is shifted by certain bits in the direction to LSB, and current pixel value being a pixel value of the original image which original image information reception unit 10 has received. The process is detailed later in the explanation of the operation.

RAM 30 stores the tables shown in FIG. 7 and 8. The tables are used by the program stored in ROM 20 in the scan conversion process. FIG. 7 shows a table used to specify the position of a previous pixel value. FIG. 8 shows a table used to determine the number of shifted bits in the bit shift in scan conversion. The tables are explained in detail later in the explanation of the operation.

CPU 40 executes the program stored in ROM 20.

VRAM 50 stores the pixel values of the motion blur computed by the program.

Figure 9:
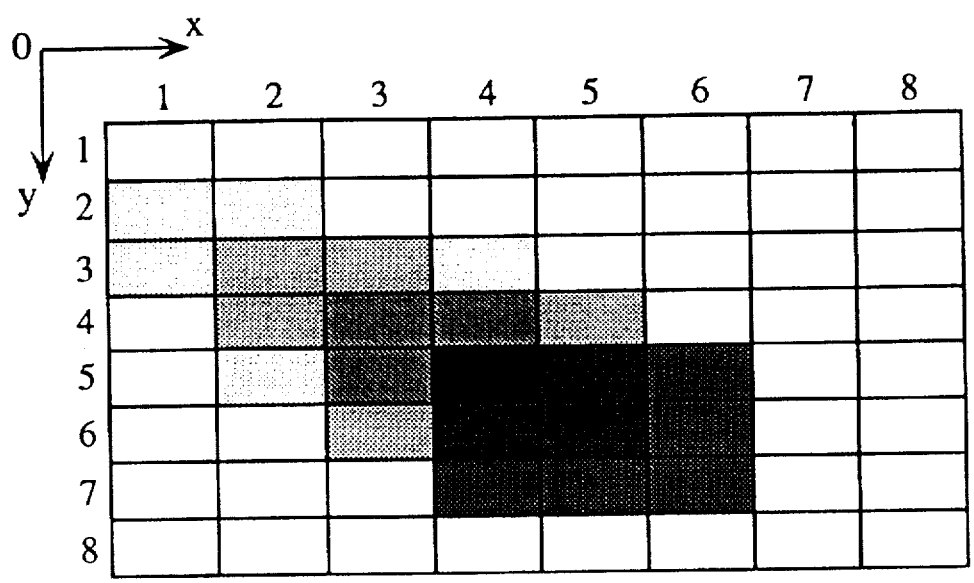
FIG. 9 shows an image which represents a motion blur.

CRT 60 displays the image of the motion blur according to the data written in VRAM 50. FIG. 9 shows an image of a motion blur. The figure depicts object 21 of FIG. 2 rapidly moving in the direction to the bottom-right of the screen.

The operation of the present animation image forming apparatus for creating an image of the motion blur is explained below following the steps shown in FIG. 3 to 6.

See FIG. 3. VRAM 50 is initialized (step S101). The original image information generating apparatus prepares for creating an original image of an object (step S102). In the present Embodiment, the object is object 21 of FIG. 2. Scan conversion is processed (step S103) as shown in FIG. 4 to 6. The scan conversion process is explained below.

See FIG. 4. A pixel position scan pattern is selected according to the information on the direction of the movement of the object which original image information reception unit 10 has received (step S201). The pixel position scan patterns are shown in FIG. 10 (a) to (d). The pixel position scan pattern is used to determine the order in which pixel positions in VRAM 50 are specified. Pixel values to be written in VRAM 50 at the respective pixel positions are computed in this order. FIG. 10 (a) indicates a pixel position scan pattern in which pixel positions are specified along the horizontal scan lines right-handed and downward; FIG. 10 (b) left-handed and downward; FIG. 10 (c) right-handed and upward; and FIG. 10 (d) left-handed and upward.

A pixel position scan pattern is selected as follows: FIG. 10 (a) pattern is selected if original image information reception unit 10 receives information that the object moves in the direction to top-left of the screen, that means, the values decrease on both X-axis and Y-axis; FIG. 10 (b) pattern if top-right and value increases on the X-axis and decreases on the Y-axis; FIG. 10 (c) pattern if bottom-left and value decreases on the X-axis and increases on the Y-axis; and FIG. 10 (d) if bottom-right direction and values increase on both X-axis and Y-axis.

Then, a previous pixel position pattern is selected from the tables of FIG. 7 based on the information on the direction of the movement of the object which original image information reception unit 10 has received (step S202). FIG. 7 (a) to (d) are tables of previous pixel position patterns. FIG. 7 (a) is a table of patterns corresponding to the movement of the object in the direction to top-left of the screen; FIG. 7 (b) for top-right; FIG. 7 (c) for bottom-left; and FIG. 7 (d) for bottom-right. For example, in FIG. 7 (a), column 701 represents dy/dx, or the direction of the movement of the object, and "−/−3" at row 712 indicates that the object proceeds "−1" on Y-axis and "−3" on the X-axis. "0, 1, and 2" shown at the top of columns 702 to 704 represent the remainders of value x divided by 3, and the values are called xmod3, where x represents a value of a current pixel on X-axis. Each of rows 711 to 717, which are the previous pixel position patterns, is combined with one of three arrows at respective three columns, 702 to 704, according to the value of xmod3. The arrows indicate the positions of previous pixels adjacent to the current pixel. For example, the leftward arrow indicates a position of a previous pixel lefthanded adjacent to the current pixel.

For example, if original image information reception unit 10 receives information that object 21 has moved 3 on the X-axis and 3 on the Y-axis, the previous pixel position pattern is selected through the following processes: (1) table (d) of FIG. 7 is selected because object 21 is moving in the direction to bottom-right, and (2) row 774 is selected because object 21 has proceeded 3 on the X-axis and 3 on the Y-axis, and the value for dy/dx at column 761 is 3/3.

The number of shifted bit(s) is determined based on the information of the distance between the previous and current object positions which original image information reception unit 10 has received (step S203). In practice, a table of FIG. 8 is used to determine the number.

In FIG. 8, A+B of column 81 represents the range of distances the object moves per unit time, where A represents the distance on the X-axis and B on the Y-axis. Column 82 represents the number of shifted bit(s). For example, if object 21 proceeds 3 on the X-axis and 3 on the Y-axis, the distance A+B is 6. Since 6 is in the range from 1 to 7 at row 812, the number of shifted bit is determined as 1. The number of shifted bit(s) increases as the distance-increases, and decreases as the distance decreases.

Figure 11:
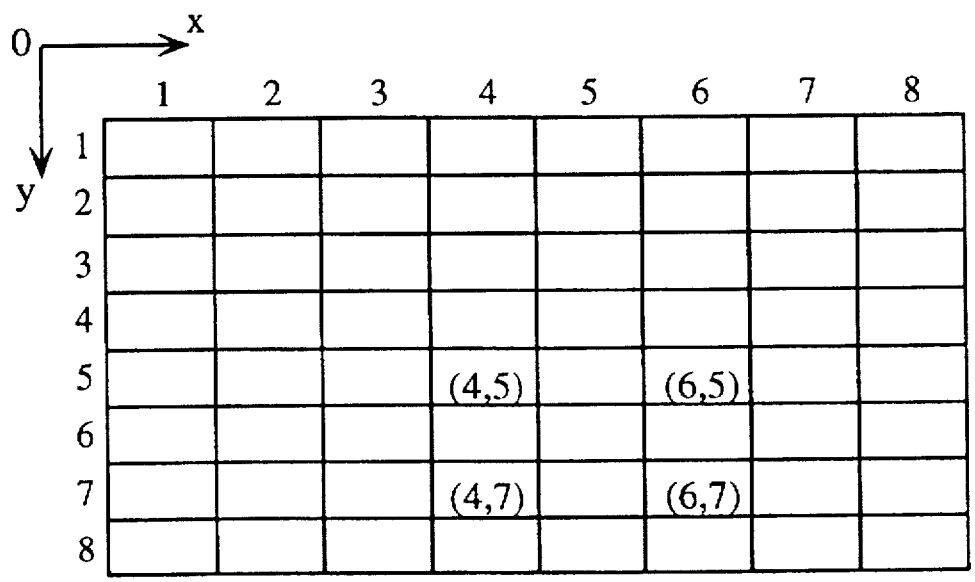
FIG. 11 shows information on position and shape of object 21.

Then, the first pixel value calculation position is determined based on the selected pixel position scan pattern, and position and shape of the object (step S204). For example, assume that a motion blur of object 21 is to be created, and FIG. 10 (d) is selected as the pixel position scan pattern, and that the pixels are represented by co-ordinates with origin (0,0) at the top-left corner, as shown in FIG. 11. Then, the position and shape of object 21 are given by four co-ordinates: (4,5), (6,5), (4,7), and (6,7). A pixel position which is to be specified first according to the selected pixel position scan pattern when four co-ordinates are given is called the first pixel value calculation position. The first pixel value calculation position in the present case of the Embodiment is (6,7).

Then, the previous pixel position is determined based on the pixel value calculation position and the previous pixel position pattern (step S205). For example, assume that the pixel calculation position is (6,7) as shown in FIG. 11 and the determined previous pixel position pattern is row 774 of FIG. 7 (b). The previous pixel position pattern of row 774 indicates that bottom-right direction should be selected regardless of xmod3 value. Accordingly, (7,8), which is in the bottom-right direction to (6,7) is determined as the previous-pixel position.

Figure 12:
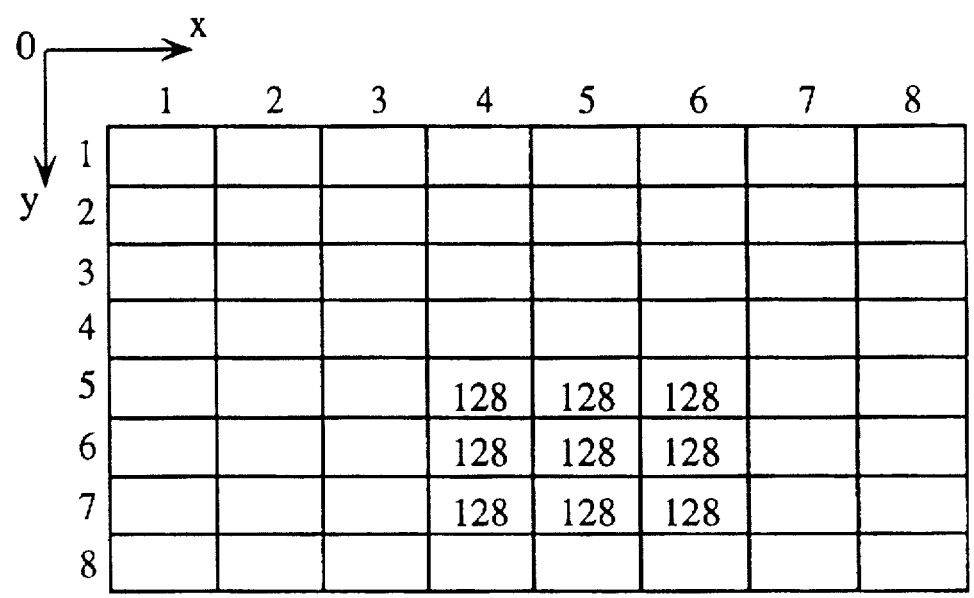
FIG. 12 shows an original image pixel value of object 21.

Then, it is determined whether the previous pixel value has already been written in VRAM 50 at the place specified by the determined previous pixel position, (7,8) (step S206). In the present case, it is determined that the previous pixel value does not exist in VRAM 50 at the place specified by the determined previous pixel position, (7,8). Then, it is determined whether the current pixel value calculation position is a pixel position of the object (step S207). In the present case, it is determined that the current pixel value calculation position, (6,7) is a pixel position of object 21. Original image information reception unit 10 receives an original image pixel value corresponding to the current pixel value calculation position, (6,7); in the present case, "128" is received as shown in FIG. 12 (step S208). FIG. 12 shows an original image pixel value of object 21.

Then, previous pixel value of previous pixel position (7,8) is read from VRAM 50 (step S209). In the present case, previous pixel value is "0" because the value does not exist on (7,8).

The pixel value of the motion blur is obtained by Equation (step S210). In the present case, the number of shifted bit is "1". Here, shifting the value, a result of (original image pixel value—previous-pixel value), in the direction to LSB by one bit equals to multiplying the value by 0.5. Thus,

*pixel value*=0+0.5·(128−0)=64.

The obtained pixel value is written in VRAM 50 at the place corresponding to the pixel value calculation position, (6,7), (step S211). Since another pixel to be processed is detected (step S212), the pixel value calculation position is updated (step S214). In the present case, the pixel position is specified according to the pattern of FIG. 10 (d), the next pixel value calculation position is (5,7).

The process continues similarly as above. The previous pixel position is determined as (6,8) according to the pattern of row 774 of FIG. 7 (d) (step S205). Since any previous pixel value is not detected on the previous pixel position (step S206), it is determined that the current pixel value calculation position is a pixel position of object 21 (step s207). Original image information reception unit 10 receives original image pixel value "128" which corresponds to the current pixel value calculation position, (5,7), as shown in FIG. 12 (step S208). In the present case, previous pixel value is "0" because the value does not exist on (6,8) (step S209). Thus,

*pixel value*=0+0.5·(128−0)=64 *(step S210).*

Figure 13:
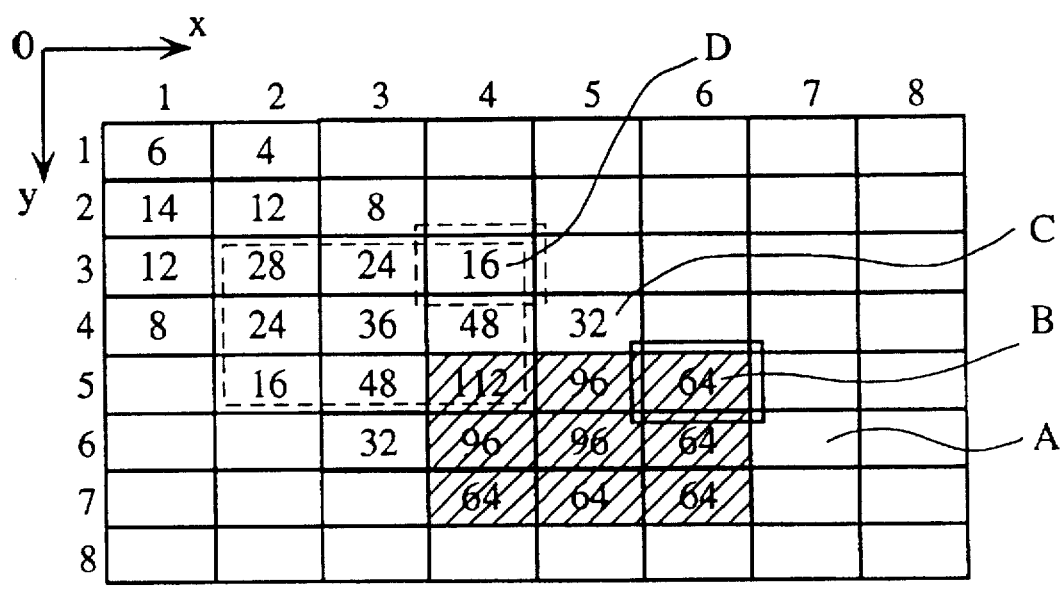
FIG. 13 shows the pixel values written in VRAM 50.

The obtained pixel value is written in VRAM 50 at the place corresponding to pixel value calculation position (5,7) (step S211). The pixel value calculation position is updated to (4,7) for the next pixel (steps S212 and S214). Similarly, pixel value 64 is obtained through steps S205 to S209 (step S210). The pixel value is written in VRAM 50 at pixel value calculation position (4,7) (step S211). FIG. 13 shows the pixel values written in VRAM 50.

Here, the next pixel value calculation position is (3,7) (steps S212 and S214), and the previous pixel position is (4,8) (step S205). Since the previous-pixel value does not exist in VRAM 50 at the place specified by the determined previous pixel position, (4,8) (step S206), and the current pixel value calculation position is not a pixel position of object 21 (step S207), steps s208 to 211 are skipped. Similarly, for the next pixel calculation position, (2,7), steps S205 to S207 are skipped (step S212 and S214). As shown above, unnecessary calculations can be omitted.

Through the above processing, all the pixel values of the motion blur are calculated as shown in FIG. 13. For example, the pixel value for co-ordinates B, (6,5) in FIG. 13 is obtained as follows: since the previous pixel value of co-ordinates A, (7,6) is "0", pixel value = 0 + 0.5 · (128 − 0) = 64;
similarly, for co-ordinates C, (5, 4),
pixel value = 64 + 0.5 · (0 − 64) =
64 − 32 = 32; and
similarly, for co-ordinates D, (4, 3),
pixel value = 32 + 0.5 · (0 − 32) =
32 − 16 = 16.

As shown above, in the adverse direction to the movement of object 21, pixel values of pixel positions B, C, and D are respectively 64, 32, and 16. It shows decrease. Such decreasing pixel values draw the motion blur as shown in FIG. 9. The decrease in the pixel values is found to be a weighted mean having the exponential function as the weight coefficient.

The scan conversion process ends when any scan line to be processed is not detected (step S213) after repeating steps S205 to S213. An image of the motion blur is displayed as shown in FIG. 9 according to the pixel values of FIG. 13 written in VRAM 50 (step S104). The above process is repeated as long as any original image of motion blur to be processed is detected (step S105); otherwise the process ends.

Note that although the Embodiment assumes one object to be processed, two or more objects can be processed. The procedure is explained below. For this purpose, steps S102, S103, S206, and S209 to S211 are partly modified. At step S102, an object to be processed is determined before the preparation for creating an original image. The object is determined based on the criterion that if two or more objects overlaps each other, the farthest object is selected. At step S103, after a scan conversion process ends for an object, it is determined whether there is any object requiring the scan conversion process, and the control goes back to step S102 if there is any such object. Another memory for storing pixel values is provided for this purpose as well as VRAM 50. At step S206, the pixel value memory is checked on whether the previous pixel value has already been written in it. The pixel value memory stores the pixel values computed for the previous scan line. At step S209, the previous pixel value is read from the pixel value memory instead of VRAM 50. At step S210, the pixel value read at step S209 from the pixel value memory is used as the previous pixel value. At step 211, if a pixel value has been written in VRAM 50, the pixel value and the value obtained at step S210 are used to calculate a new pixel value, which is written in VRAM 50 as the updated value.

Note that the opaqueness can be used together with pixel values. While the pixel value represents a color of the pixel, the opaqueness is a value used to determine the ratio of the pixel values of two overlapping objects, and is a value obtained from the opaqueness unique to the object multiplied by the pixel area contribution ratio, which is the ratio of the object to the pixel area. The opaqueness can take the values, for example, in the range of 0 to 1. Higher the value, higher the opaqueness. Suppose object B with pixel value 20 and opaqueness 0.8 is painted on object A with pixel value 50, then $$\text{pixel value} = 20 \cdot 0.8 + 50 \cdot (1 - 0.8)$$
$$= 26.$$

Accordingly, the pixel value for the overlapped area is updated to 26. The scan conversion process is done on the opaqueness as well as the pixel value. Thus, the opaqueness decreases as the motion blur reaches the end of the trail in the same manner as the pixel value. Either the opaqueness unique to the object or the pixel area contribution ratio can be used instead of opaqueness.

Furthermore, midpoint line scan-conversion algorithm (James D. Foley, Andries van Dan, Steven K. Feiner, John F. Hughes, "Computer Graphics (principles and practice)", Addison-Wesley Publishing Company, pp.72–78), which is used in linear drawing with tilt, can be used instead of the method of the present Embodiment in which the previous pixel position is selected. The method produces the same effects as the method of the present Embodiment.

Furthermore, in case the same object has different directions or distances, such as in a rotating object, the object can be divided into some parts, each part having almost the same direction or distance of the movement, and the scan conversion process can be applied to each part, treating the part as an independent object.

What is claimed is:

1. An image forming apparatus for creating an image of a motion blur of an object by sequentially creating each pixel of the motion blur from pixel values of an original image, the motion blur being a trail of a rapidly moving object, comprising:

an image memory for storing pixel values of a motion-blur image;

a pixel position specifying means for sequentially specifying a pixel position for all the pixels in the image memory adverse to a direction of the movement of the object;

an original image data storage means for storing data of the original image which includes an image of the object;

an original image pixel value generating means for generating an original image pixel value corresponding to the pixel position specified by the pixel position specifying means based on the data stored in the original image data storage means;

a pixel value calculating means for dividing by a certain value a result of the original image pixel value generated by the original image pixel value generating means subtracted by a pixel value in the image memory whose pixel position is adjacent to the pixel position specified by the pixel position specifying means in the direction of the movement of the object and adding a quotient of the division to the pixel value to obtain a pixel value each time the original image pixel value generating means generates an original image pixel value; and a pixel value writing means for writing the pixel value obtained by the pixel value calculating means as the pixel value of the pixel position specified by the pixel position specifying means.

2. The image forming apparatus as defined in claim 1 wherein the pixel position specifying means comprises:

a line specifying means for sequentially specifying one of vertical lines and horizontal lines of the image memory adverse to the direction of the movement of the object; and a position specifying means for sequentially specifying a pixel position on the line specified by the line specifying means each time the line specifying means specifies the line.

3. The image forming apparatus as defined in claim 2 wherein the pixel value calculating means comprises:

a pixel position selecting unit for selecting a pixel position which is in the direction of the movement of the object and is one of:

a pixel position prior to, and on the same line as, the pixel position specified by the pixel position specifying means, a pixel position prior to, and on a previous line of, the pixel position specified by the pixel position specifying means, and a same pixel position as, and on the previous line of, the pixel position specified by the pixel position specifying means;

a pixel value reading unit for reading a pixel value at the pixel position in the image memory selected by the pixel position selecting unit; and a pixel value calculating unit for dividing by the certain value the result of the original image pixel value generated by the original image pixel value generating means subtracted by the pixel value read by the pixel value reading unit and adding the quotient of the division to the pixel value to obtain the pixel value each time the original image pixel value generating means generates an original image pixel value.

4. The image forming apparatus as defined in claim 3 wherein the pixel value calculating unit comprises:

a certain value determining unit for determining a value which is higher than 1 and increases in proportion to a speed of the object as the certain value, the pixel value calculating unit performing the division using the certain value determined by the certain value determining unit.

5. The image forming apparatus as defined in claim 4 wherein the pixel position selecting unit comprises:

a pixel position pattern table for having a plurality of patterns of combinations of a direction of the movement of the object and pixel positions adjacent to a certain pixel position; and a pixel position determining unit for setting the pixel position specified by the pixel position specifying means as the certain pixel position, and determining a pixel position by referring to the pixel position pattern table based on the certain pixel position, the direction of the movement of the object, and a remainder of the pixel position specified by the pixel position specifying means divided by a certain numeral value.

6. The image forming apparatus as defined in claim 5 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

7. The image forming apparatus as defined in claim 4 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

8. The image forming apparatus as defined in claim 3 wherein the pixel value calculating unit achieves the division by shifting the subtraction result in binary notation by a certain number of bits in a direction to a least significant bit.

9. The image forming apparatus as defined in claim 8 wherein the pixel value calculating means further comprises:
a bit-shift table for having a plurality of combinations of an object speed and a respective number of bits to be shifted, the pixel value calculating unit determining the certain number of bits by referring to the bit-shift table based on a speed of the object.

10. The image forming apparatus as defined in claim 9 wherein the pixel position selecting unit comprises:
a pixel position pattern table for having a plurality of patterns of combinations of a direction of the movement of the object and pixel positions adjacent to a certain pixel position; and
a pixel position determining unit for setting the pixel position specified by the pixel position specifying means as the certain pixel position, and determining a pixel position by referring to the pixel position pattern table based on the certain pixel position, the direction of the movement of the object, and a remainder of the pixel position specified by the pixel position specifying means divided by a certain numeral value.

11. The image forming apparatus as defined in claim 10 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

12. The image forming apparatus as defined in claim 9 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

13. The image forming apparatus as defined in claim 8 wherein the pixel position selecting unit comprises:
a pixel position pattern table for having a plurality of patterns of combinations of a direction of the movement of the object and pixel positions adjacent to a certain pixel position; and
a pixel position determining unit for setting the pixel position specified by the pixel position specifying means as the certain pixel position, and determining a pixel position by referring to the pixel position pattern table based on the certain pixel position, the direction of the movement of the object, and a remainder of the pixel position specified by the pixel position specifying means divided by a certain numeral value.

14. The image forming apparatus as defined in claim 13 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

15. The image forming apparatus as defined in claim 8 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

16. The image forming apparatus as defined in claim 15 wherein the pixel position selecting unit comprises:
a pixel position pattern table for having a plurality of patterns of combinations of a direction of the movement of the object and pixel positions adjacent to a certain pixel position; and
a pixel position determining unit for setting the pixel position specified by the pixel position specifying means as the certain pixel position, and determining a pixel position by referring to the pixel position pattern table based on the certain pixel position, the direction of the movement of the object, and a remainder of the pixel position specified by the pixel position specifying means divided by a certain numeral value.

17. The image forming apparatus as defined in claim 16 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

18. The image forming apparatus as defined in claim 17 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

19. The image forming apparatus as defined in claim 2 wherein the pixel value calculating means comprises:
a certain value determining unit for determining a value which is higher than 1 and increases in proportion to a speed of the object as the certain value, the pixel value calculating means performing the division using the certain value determined by the certain value determining unit.

20. The image forming apparatus as defined in claim 19 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

21. The image forming apparatus as defined in claim 2 wherein the pixel value calculating means achieves the division by shifting the difference in binary notation by a certain number of bits in a direction to a least significant bit.

22. The image forming apparatus as defined in claim 21 wherein the pixel value calculating means comprises:
 a bit-shift table for having a plurality of combinations of an object speed and a respective number of bits to be shifted, the pixel value calculating unit determining the certain number of bits by referring to the bit-shift table based on a speed of the object.

23. The image forming apparatus as defined in claim 22 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

24. The image forming apparatus as defined in claim 21 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

25. The image forming apparatus as defined in claim 2 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

26. The image forming apparatus as defined in claim 1 wherein the pixel value calculating means comprises:
 a certain value determining unit for determining a value which is higher than 1 and increases in proportion to a speed of the object as the certain value, the pixel value calculating means performing the division using the certain value determined by the certain value determining unit.

27. The image forming apparatus as defined in claim 26 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

28. The image forming apparatus as defined in claim 1 wherein the pixel value calculating means achieves the division by shifting the difference in binary notation by a certain number of bits in a direction to a least significant bit.

29. The image forming apparatus as defined in claim 28 wherein the pixel value calculating means comprises:
 a bit-shift table for having a plurality of combinations of an object speed and a respective number of bits to be shifted, the pixel value calculating unit determining the certain number of bits by referring to the bit-shift table based on a speed of the object.

30. The image forming apparatus as defined in claim 29 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

31. The image forming apparatus as defined in claim 28 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

32. The image forming apparatus as defined in claim 1 wherein the pixel value calculating means uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

33. An image forming method for creating an image of a motion blur of an object, the image forming method being used in an image forming apparatus which creates the image by sequentially creating each pixel value of the motion blur from data of an original image stored in an original image data storage and writes the created pixel value into an image memory, the motion blur being a trail of a rapidly moving object, comprising:
 a pixel position specifying step for sequentially specifying a pixel position for all the pixels in the image memory adverse to a direction of the movement of the object;
 an original image pixel value generating step for generating an original image pixel value corresponding to the pixel position specified by the pixel position specifying means based on the data stored in the original image data storage means;
 a pixel value calculating step for dividing by a certain value a result of the original image pixel value generated by the original image pixel value generating step subtracted by a first pixel value in the image memory whose pixel position is adjacent to the pixel position specified by the pixel position specifying means in the direction of the movement of the object and adding a quotient of the division to the first pixel value to obtain a pixel value each time the original image pixel value generating step generates an original image pixel value; and
 a pixel value writing step for writing the pixel value obtained by the pixel value calculating step as the pixel value of the pixel position specified by the pixel position specifying step.

34. The image forming method as defined in claim 33 wherein the pixel position specifying step comprises:
 a line specifying step for sequentially specifying one of vertical lines and horizontal lines of the image memory adverse to the direction of the movement of the object; and
 a position specifying step for sequentially specifying a pixel position on the line specified by the line specifying step each time the line specifying step specifies the line.

35. The image forming step as defined in claim 34 wherein the pixel value calculating step comprises:
 a pixel position selecting step for selecting a pixel position which is in the direction of the movement of the object and is one of:
  a pixel position prior to, and on a same line as, the pixel position specified by the pixel position specifying step,
  a pixel position prior to, and on a previous line of, the pixel position specified by the pixel position specifying step, and a same pixel position as, and on the previous line of, the pixel position specified by the pixel position specifying step;

a pixel value reading step for reading a pixel value at the pixel position in the image memory selected by the pixel position selecting step; and a pixel value calculating sub-step for dividing by the certain value the result of the original image pixel value generated by the original image pixel value generating step subtracted by the pixel value read by the pixel value reading step and adding the quotient of the division to the pixel value to obtain the pixel value each time the original image pixel value generating step generates an original image pixel value.

36. The image forming method as defined in claim 35 wherein the pixel value calculating sub-step achieves the division by shifting the subtraction result in binary notation by a certain number of bits in a direction to Least Significant Bit.

37. The image forming method as defined in claim 36 wherein the pixel value calculating step determines the certain number of bits by referring to a bit-shift table, the bit-shift table having a plurality of combinations of an object speed and a respective number of bits to be shifted.

38. The image forming method as defined in claim 37 wherein the pixel position selection step sets the pixel position specified by a pixel position specifying step as the certain pixel value, and determining a pixel position by referring to a pixel position pattern table based on the certain pixel position, the direction of the movement of the object, and a remainder of the pixel position specified by the pixel position specifying step divided by a certain numeral value, the pixel position pattern table having a plurality of patterns of combinations of a direction of the movement of the object and pixel positions adjacent to the certain pixel position.

39. The image forming apparatus as defined in claim 38 wherein the pixel value calculating step uses in calculation one of an object-unique opaqueness, a pixel area contribution ratio, and an opaqueness, which is a result of the object-unique opaqueness multiplied by the pixel area contribution ratio, the object-unique opaqueness and the pixel area contribution ratio and the opaqueness being calculated in a same manner as the pixel values.

* * * * *